UNITED STATES PATENT OFFICE.

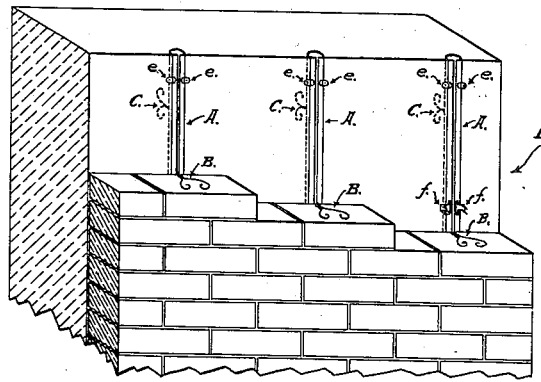
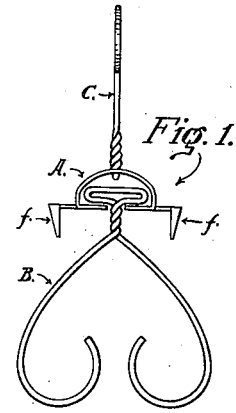
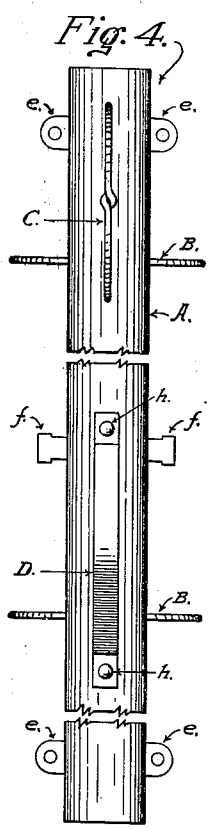
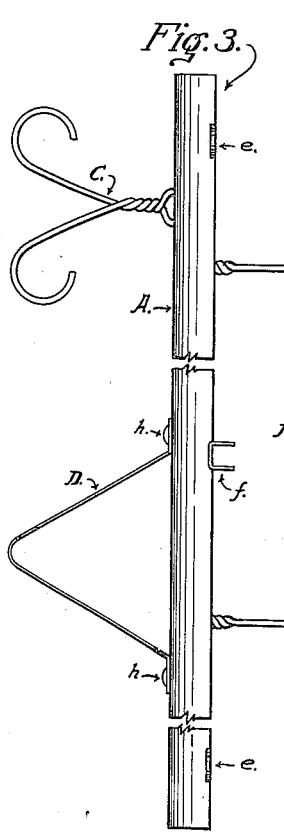
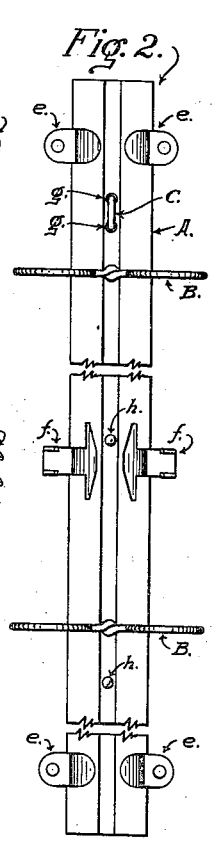

JOSEPH FRANCIS THOMPSON, OF KANSAS CITY, MISSOURI.

BONDING CONSTRUCTION FOR BUILDINGS.

1,304,219.     Specification of Letters Patent.     Patented May 20, 1919.

Application filed July 31, 1916. Serial No. 112,298.

*To all whom it may concern:*

Be it known that I, JOSEPH FRANCIS THOMPSON, a citizen of the United States, residing at Kansas City, in the county of Jackson and State of Missouri, have invented a new and useful Bonding Construction for Buildings, of which the following is a specification.

The present invention relates to building constructions, and particularly to building walls of the class in which facing material is applied to the exterior of the main building wall, and aims to devise an improved bonding construction whereby all types of facing material may be securely bonded in proper fixed relation to such walls.

Accordingly one of the objects of the invention is to provide a bonding construction in which the arrangement and location of the bonding elements may be so adjusted and controlled that the exact position of the same in the actual work may be positively and definitely prearranged and set forth by the architect or engineer in his specification. In carrying out this object a construction is provided in which each bonding element which engages the facing material is arranged for adjusting movement in a direction parallel to the face of the building wall for proper positioning of the bonding element in direct engagement with the facing material at the proper point, or for positioning of said bonding element between any two successive courses of the facing material as the conditions may require.

It is also an object to provide bonding members which may be constructed economically out of sheet material, the manufacture of which will also provide attaching portions whereby the bond may be conveniently and securely fastened in place to the forms where the main building wall is being constructed of concrete material.

It is a further object to devise a simple, strong and durable construction for the purpose stated, of few parts and adapted to greatly facilitate the bonding operation in work of this character.

With these general objects in view, and such minor objects as may appear in the course of the specification, the invention will now be described with reference to the accompanying drawing illustrating an arrangement and construction embodying the present improvements, after which those features and combinations deemed to be novel will be severally specified and set forth in the appended claims.

In the drawing—

Figure 1 is a plan view, showing bonding members constructed in accordance with the present invention;

Figs. 2, 3 and 4 are face, side and rear views, respectively, of the same shown in elevation and partly broken away;

Figs. 5 and 6 are fragmentary perspective views of portions of the channel track bonding member and showing, respectively, alternate forms of fastening lugs for attachment to the concrete form; and Fig. 7 shows a perspective view of a portion of a building wall, illustrating the bonding members constructed and arranged in accordance with the present invention.

Referring to the drawing in detail, each set of bonding members comprises a track member A adapted to be secured to the face of the main building wall 2 and extending substantially the entire distance across its face, and a series of bonding elements B arranged for adjustment along said track member and projecting in position to engage the facing material 3. The track member A is preferably of substantially D-shaped cross-section, conveniently made up from sheet material, and as the proposed construction is designed especially for concrete work each track member is provided with means for securing it with its flat face against the concrete form (not shown), this means comprising either the perforated lugs *e* adapted for the use of tacks, nails or equivalent fastening elements, or the staple fastening lugs *f* adapted to be driven into the form; or both said forms of fastening means may be used if desired, and both the lugs *e* (see Fig. 5) and the lugs *f* (see Fig. 6) are such as may be conveniently stamped out of the material forming the track member A.

Since the cross-sectional form of the track member is not such as to afford any anchorage means after the concrete is poured, bonding elements C, or D, or both forms of bonds if desired, are secured to the curved side of the member A, these bonding elements extending to the rear in position to be sealed in the concrete of the wall 2. The bonding elements C are constructed of strong wire passing through perforations *g* in the member A and secured by twisting of the wire as shown in Figs. 1 and 3, and thereafter spread to form the antennæ-like projections shown in the latter figure. The bonding elements D are of strap iron or the like formed V-shaped and secured at their opposite ends at h to the member A by means of rivets or welding or in any preferred manner. As a rule the form of bonding element D will be preferred for securing the track members A in place, since this construction is better adapted to withstand the shocks and pressure incident to the pouring of the concrete and therefore will not be readily forced or bent out of proper holding position.

Each member A is formed as a channel track member with its flat face substantially flush with that of the wall 2 being formed, and this flat outer face of each member A is provided with a longitudinal slot opening 4 (see Fig. 2). The bonding elements B are preferably constructed of strong wire material having the projecting portions as shown in Figs. 1 and 7 for engagement with the facing material 3, said wire being twisted to form a neck and a head or key portion B' adapted to be inserted through the slot 4 into the channel of the member A, the member B being given a quarter turn after its key portion has been thus inserted for locking the parts A and B together while leaving the latter free for relative movement along the slot 4, as will be clearly understood.

It will thus be apparent that a simple and efficient construction of bonding means has been devised for carrying out the objects of the invention. The track members A are secured at the specified points or intervals by means of the lugs e, f, to the inside of the form which is to confine the concrete material of the wall 2, the bonding elements B not being assembled until after the wall 2 has been poured and set. After said wall has been poured and set the form is replaced with the facing material 3, and in the case of brick or the like the workman has at hand a supply of the bonding elements B which he places at the proper intervals between the successive courses of the material, thus always forming a direct bonding union in the most effective manner, i. e., exactly at the joint line of the facing material and in a direct line from the wall 2 to said facing material. The objection to most of the prevailing methods of bonding face material is the fixed character of the bonding projections the position of which the architect or engineer can not definitely control with a view to having them aline properly with the lines of the facing material; consequently such a construction is apt to leave these bonding projections occupying all sorts of angular positions having a constant tendency to buckle up and weaken the work as well as giving the same an unsymmetrical and more or less unsightly appearance. The present improvements eliminate any possibility of the bonding elements for the facing material coming anywhere but in their proper and most effective position in relation to the parts to be secured together, and the number and position of such bonding elements may be exactly specified by the architect and such specifications carried out to the letter. It will also be observed that this provision of a bonding construction in which the facing material is secured by bonds free to move parallel to the face of the concrete wall will permit any unequal settling of the wall and facing material without damage to any of the parts.

The profile shown for the bonding elements B is merely illustrative, as it is obvious that any form suitable for attachment to or building in along with the facing material is within the purview of the present improvements, as, for example, with face material comprising tiling it may be desired to secure the bonds B by positive engagement or connection with portions of the tiling constructed for that purpose. Again, the track members A may take any form and length and position desired; for securing cornices, belt courses, sill lines and the like, these track members should usually be installed in horizontal position, but they may be constructed and installed in circular profiles for arch work, or in diagonal positions, if necessary, according to the requirements of the particular wall construction.

While the foregoing represents what is now deemed to constitute the preferred form of embodiment of the invention, the right is reserved to such formal changes and modifications as may fairly fall within the scope of the appended claims.

Claims:

1. Bonding means for securing facing material to building walls, comprising a continuous channel track member extending substantially the entire distance across the face of the wall, said member being formed with a flat outer face and provided with antennæ-shaped wire projections adapted to be embedded in the building wall with said outer face of the member lying flush with the face of said wall, said outer face of the member having a continuous longitudinal slot opening extending the entire length of said member, said slot opening being of uniform width throughout its length, and a series of bonding elements for engagement between successive courses of the facing material, said elements being adjustable along said slot opening and having T-shaped key portions insertible into said slot opening at any point along the same and adapted, on being given a quarter-turn, to effect retaining engagement with the inner margins of said slot opening at all points along said opening.

2. Bonding means for securing facing material to concrete building walls comprising a continuous channel track member extending substantially the entire distance across the face of the building wall, said track member being of substantially D-shaped cross-section formed of sheet material and provided with T-shaped portions stamped from its flat face and bent to form staple-like projections for securing the member to the concrete form with the flat face of the member flush with the face of said building wall, said member having a longitudinal slot opening along the flat face thereof, and a series of bonding elements for engagement between successive courses of the facing material, said elements being adjustable along said slot opening and insertible at any point along said opening and having key portions formed for detachable connection with said member by engagement with the inner margins of said slot opening.

JOSEPH FRANCIS THOMPSON.

Witnesses:
 JESSE A. HODGE,
 PETER MARTIN.